United States Patent [19]

Nawothnig

[11] Patent Number: 4,927,671

[45] Date of Patent: May 22, 1990

[54] METHOD OF PRODUCING COLORED DECORATIONS ON CERAMIC PRODUCTS

[75] Inventor: Klaus Nawothnig, Brachttal, Fed. Rep. of Germany

[73] Assignee: Wachtersbacher Keramik Otto Friedrich Furst zu Ysenburg und Budingen GmbH & Co. KG, Brachttal, Fed. Rep. of Germany

[21] Appl. No.: 157,378

[22] Filed: Feb. 18, 1988

[30] Foreign Application Priority Data

Feb. 21, 1987 [DE] Fed. Rep. of Germany ....... 3705572

[51] Int. Cl.$^5$ .......................... B05D 3/02; B05D 5/00
[52] U.S. Cl. .................... 427/274; 427/279; 427/281; 427/287
[58] Field of Search ............... 427/279, 287, 244, 373, 427/280, 281, 274, 393.6; 8/477; 118/415

[56] References Cited

U.S. PATENT DOCUMENTS 4,169,908 10/1979 Hatfield ............................... 427/287
4,204,876 5/1980 Bowden .................................. 106/90

FOREIGN PATENT DOCUMENTS 1404455 8/1975 United Kingdom .

OTHER PUBLICATIONS

Derwent No. 82-20740, Derwent Publications Ltd., London, Abstract of Japanese application 57-22187.

Primary Examiner—Evan Lawrence
Attorney, Agent, or Firm—Marmorek, Guttman & Rubenstein

[57] ABSTRACT

A method for producing colored decorations on ceramic products by foaming an aqueous suspension of a pigment containing at least one surface active agent, contacting a ceramic body with the foam to deposit the pigment on the body, and heating the ceramic body to a temperature of about 600° to 1500° C.

7 Claims, 1 Drawing Sheet

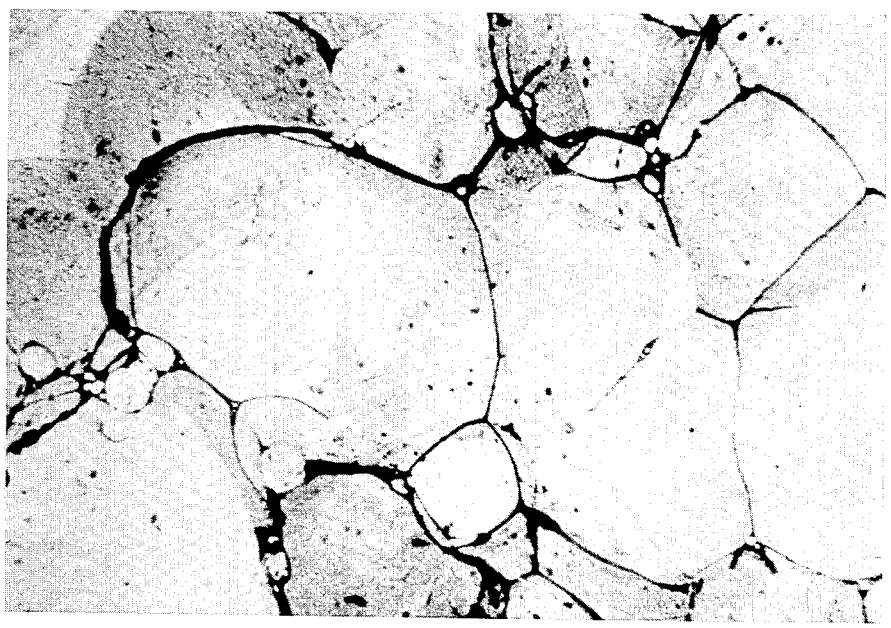

METHOD OF PRODUCING COLORED DECORATIONS ON CERAMIC PRODUCTS

BACKGROUND OF THE INVENTION

The instant invention relates to a process for the production of colored decorations on ceramic products by applying expanded pigment/water suspensions.

Thanks to their known physical characteristics, ceramic products have many applications in industry, technology and in the house in form of coarse and fine ceramics.

The term "ceramic products" encompasses products made from silicotic and non-silicotic raw materials by shaping them at room temperature and hardening them by firing at a temperature between 600° and 200° C.

While their physical and mechanical properties are of foremost importance in the coarse ceramic products such as bricks, clinkers, stoneware and refractory building materials, great weight is in addition placed on the color and decorative aspect of the surfaces of fine ceramic products such as china, wall tiles, floor tiles, sanitary items and luxury items.

To achieve this, watery pigments or colorant suspensions are as a rule applied by pouring, dipping or printing processes to the fired or unfired ceramic products which may be glazed or unglazed and are then fired into the body at temperatures ranging from 600° to 1500° C. so as to become a permanently adhering decorative layer.

It is the object of the instant invention to create a new technical process making it possible to achieve new surface effects on ceramic products. This object is attained through the process according to the invention.

SUMMARY OF THE INVENTION

It is therefore the purpose of the invention to propose a process for the production of colored decorations on ceramic products by application of watery pigment or colorant suspensions on the ceramic body with subsequent firing at temperatures between 600° and 1500° C., characterized in that the pigment or colorant suspensions are caused to foam by adding one or several surface-active substances and in that the ceramic body is brought into contact with the foam phase.

The embodiments of the process according to the claims are further objects of the instant invention.

BRIEF DESCRIPTION OF THE DRAWINGS

The FIGURE is a photomicrograph of a ceramic product made in accordance with the inventive process.

DETAILED DESCRIPTION OF THE INVENTION

The pigments which are utilized according to the invention to impart color are the generally commercially available fireproof compounds of the Spinell type, of the zircon-silicate type or the ceramic colors manufactured according to the so-called inclusion process. A comprehensive list of the suitable compounds is contained in Ullmann's Encyclopedia of Technical Chemistry (Ullmann's Enzyklopädie der technischen Chemie), 1972, volume 14, page 1 ff as well as in the additional literature listed therein.

Since the application of the pigment or colorants on the ceramic product according to the invention takes place through the foam phase, the ceramic body does not come into direct contact with the non-foaming watery phase.

For this reason the pigment concentration in the watery phase (pulp) is non-critical for the process according to the invention and is variable within relatively wide limits.

In general the concentrations in a weight ratio of water to pigment of 0.7:1 to 20:1, especially 0.9:1 to 2:1 have proven advantageous. When necessary, other ratios are also possible to achieve special effects, but a ratio of 1:1 is preferred.

To carry out the process according to the invention it is necessary to concentrate the pigment or colorant particles in sufficient concentration in the foam phase.

For this it is necessary for the particles in form of a slurry in water to be able to attach themselves to air bubbles and to be carried by these to the surface. Because of the outer lattice binding forces of the crystal surface and because of the oxygen atoms with affinity to hydrogen however, a layer of water molecules is attached more or less firmly around the particle. This layer of water prevents adhesion of the air bubbles.

It is therefore necessary to reduce the wettability of the particles by water in order to obtain an adhesion of the air bubbles. For this purpose the surfaces must be rendered water repellent. This is no longer necessary with some minerals such as graphite and molybdenite which have by nature a water repellent surface.

The substances (collectors) used to render the surfaces of the pigment particles water repellent are natural or synthetic surface-active compounds carrying in general at least one chemically polar group on a longer chain of hydrocarbon atoms (ion-active surface-active agents). According to the invention the ion-active surface-active agents used can be compounds whose hydrocarbon remnant may be branched, saturated or unsaturated, aromatic, cyclic or non-cyclic and could possibly also contain heteroatoms such as oxygen, nitrogen or sulphur. The remnant of hydrocarbon contains generally 6 to 22 carbon atoms in the chain and carries one or more hydrophilic groups.

Carboxylates, sarcosides, sulfamido-carboxylates, sulfates, alkyl and aryl ether sulfates, amidoether sulfates, sulfated carboxylates, sulfated carbonic acid glycerides, sulfated carbonic acid esters and amides, alkylsulfonate, sulfonated carboxylates, aryl sulfonates, sulfurated carbon acid esters and amides, carboxylesters and carboxylamide sulfonates, sulfosuccinitic acid esters, ether sulfonates, thiosulfates, phosphates, glycerine phosphates, phosphites, phosphonates, phosphinates, dithiophosphates and xanthates are suitable anionic surface-active agents.

Primary, secondary, tertiary and quaternary ammonium salts, benzyl ammonium salts, alkanol ammonium salts, benzyl salts, imadazolinium salts, oxazolinium salts, thiazolinium salts, salts of aminoxides, sulfonium salts, chinolinium salts, isochinolinium salts and tropylium salts are suitable cationic surface-active agents.

Dipolar ion surface-active agents such as aminoxides, imidazoline carboxylates, betaines, aminocarbonic acids, ampholytes or nonionic surface-active agents such as polyglycolether, arylpolyglycolether, polyglycolester, polyglycolamide, polypropylenglycolether, ester and amides, polyalcohols, polyamines, glycosides are also suitable.

According to the invention alkylbenzene sulfonates, alkylsulfates, alkylethersulfates, alkylsulfosuccinates, aminoxides, alkylsulfosuccinates, aminoxides and alkanolamides are preferred. These compounds can be used by themselves or in mixtures with each other or among each other.

The formula (1) of suitable alkylbenzene sulfonates is

 (1)

where R is a straight-chain or branched alkyl remnant with 4 to 16, preferably 8 to 12 carbon atoms and M is an alkali metal cation or ammonium ion, preferably sodion.

Suitable alkylsulfates or alkylether sulfates have the formula (2)

$$R(-O-CH_2-CH_2)_nO-SO_3M \qquad (2)$$

where R is a straight-chain or branched alkyl remnant with 6 to 22, preferably 12 to 14 C-atoms, M is an alkali metal cation or ammonium ion, preferably a sodion, and where n has a value between 0 and 10, preferably between 2 and 5, in particular 3.

The formula (3) of suitable alkylsulfosuccinates is

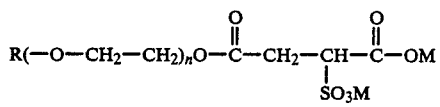 (3)

where R is a straight-chain or branched alkyl remnant with 6 to 22, preferably 12 to 14 C-atoms, where M is an alkali metal cation or ammonium ion, preferably a sodion and where n represents a value between 0 and 10, preferably between 2 and 5 and in particular 3.

The formula (4) of suitable alkanolamides is:

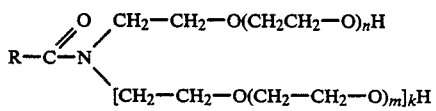 (4)

where R is a straight-chain or branched alkyl remnant with 6 to 22, preferably 8 to 18 C-atoms, where n and m may be equal or different and represent a number from 0 to 10, preferably 3 and where k may represent 0 or 1.

The formula (5) of suitable aminoxides is:

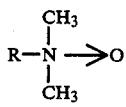 (5)

where R can be a straight-chain or branched alkyl remnant with 6 to 22, preferably 8 to 18 C-atoms.

The choice of the kind and quantity of suitable compounds, together with the kind and grain size of the pigment as well as a number of other factors such as degree of hardness of the water used, depends on the pH value in the watery phase. The decisive criterium is finally the degree of strength with which the gas bubble adheres to the particle.

The particle size of the pigments which are also used according to the invention can go from approximately 0.01 to 100 μm, with the commercially current pigments being listed in general at 0.1 to 10 μm.

It is known that the intensity with which the gas bubble adheres increases as the wetting angle increases. For this reason the determination of the wetting angle which can be determined by the known methods by simple physical measurement is a sure criterium to judge the effectiveness of the particular anion-active surface-active agents.

Visual observation of the wetting angle as different parameters such as pH value, changing concentration of the surface-active substances or change make it possible to define the area in which the optimization tests are to be carried out in practice, even on basis of a small number of tests. The area in which the bubble does not adhere can be eliminated.

In practice, quantities from 0.001 to 10 g, preferably 0.10 to 1 g surface-active agents per 100 g of pigment have proven feasible to carry out the process according to the invention, with particles around approximately 0.1 μm and below can added. The adhesion of the air bubbles to the particles is a necessary, but not a sufficient condition to carry out the process according to the invention. When an air bubble with the particle reaches the surface it normally bursts and the particle sinks back. It is therefore necessary to stabilize the air bubbles so that they constitute a foam which can be deposited on the ceramic body together with the pigment particle.

The foam produces which are added according to the invention are natural or synthetic organic compounds with a polar hydrophile group (OH, COOH, CO, NH$_2$) containing a water repellent hydrocarbon remnant.

Foam producers lower the capillary tension of the water since they have a lower capillary tension than the latter. A certain degree of water solubility is therefore required to obtain good distribution in the watery phase. The size of the bubbles and thereby also their strength and cohesion can be controlled through the choice of the type and quantity of the foam producing agent.

The foam producing agents preferred according to the invention have no structure leading to parallel orientation. For this reason carbohydrates with branched chains and unsymmetrically arranged hydrocarbon groups are used.

The foam should be elastic and have sufficient constancy for practical applications, but should be relatively easy to destroy in contact with the ceramic body. Compounds with long nonpolar chains produce bubbles of great strength but little constancy and those with short chains produce bubbles of low strength but great constancy. Based on this general rule, only a few tests for general orientation are needed to find the best foam producing agent for the given system.

Since cationic surface-active agents as well as some anionic surface-active agents, e.g. the alkali salts of fatty acids and alkyl sulfates act at the same time as foam producing agents, the addition of foam regulators may in some cases be also required.

In addition to the foam producing agents with more or less slow hydrocarbon remnants, polypropylene glycols of varying chain lengths, tirethoxybutane or methylsobutylcarbinol as well as terpenes or cresols can also be added.

The quantities of foam producing agent are in the range of 0.005 to 0.05 g/kg of pigment; when concentrations are too high the foam formation stops.

The sorption of surface-active substances to the upper surface depends to a great extent on the chemical environment in the watery phase, especially on the pH value. According to the invention, work takes place mainly in the pH range of 3–10, and in particular 6–8.

Based on the water repellant character of the pigment particles of varying composition which can thereby be regulated, pigments in desired combinations can be brought into the foam phase and can be separated on the ceramic body.

Further possible additions which activate and passivate the sorption of the collector on the pigments (so-called regulators) assist the effect obtainable by changing the pH value. Whether a reagent has a deactivating (depressor) or activating (revivor) effect depends on the prevailing conditions, and therefore no general classification is possible. For non-sulfitic pigments, silicate of sodium is used as a modifying reagent.

The size of the air bubbles are also significant and must be adapted to the given circumstances.

Air bubbles exceeding a certain size do not adhere for any length of time to the particles which were rendered water-repellent but detach themselves and rise. On the other hand, a certain minimum size must be respected as the buoyancy of the bubble would otherwise not be sufficient to carry the particle upwards. IN addition to other factors, such as the manner in which the air bubbles are produced and their flow attitude, the bubble size is thus practically determined also by the particle size.

The formation of the air bubbles in the water pigment-surface-active agent-water suspension takes place according to the methods known in technology by means of the devices normally used for this.

Air is introduced from below into containers of varied construction and is distributed finely through appropriate nozzles or is shattered mechanically by high-speed agitators (rotors) into a mixture of bubbles of various sizes. Each of these process is in principle suitable for the process according to the invention, whereby the geometric configuration may follow the existing technical examples or may be adapted freely to existing operating conditions.

The criteria for the selection of appropriate surface-active substances in function of the chemical composition of the pigments, as well as the auxiliary reagents to be added if necessary, such as foam regulators, depressors and revivers are known from technology as well as the instrumentation for the production of foam. The process according to the instant invention is also carried out on the basis of these technologies and know-hows, whereby the overall process can be departmentalized into four (schematic) partial steps following each other:
1. Production of a pigment suspension (pulp).
2. Gas absorption of the suspension in combination with simultaneous production of a foam phase.
3. Separation of the foam on the ceramic body.
4. Firing.

The optimization of the different partial steps can be carried out rapidly and without difficulties on basis of the above-mentioned and generally known technical, chemical or physical facts based on a few oriented Tests (Ullmanns Enzyklopädie der techischen Chemie 1977, Vol. 2, 4th edition, p. 110 ff).

Depending upon the selection of pigments, many different combinations are possible for the color of the background and of the design. All refractory pigments used in ceramics as colorants are usable alone or in combinations.

Underglazes, decoration within the glaze as well as overglaze decorations can be applied by the process according to the invention. Decoration within the glaze is preferred. For this the glazed, unfired formed piece is placed manually or by means of a mechanical device into a device into the foam phase so that the foam can adhere to the entire surface. If desired, portions of the surface may be asked off to obtain special effects. At the contact with the formed piece the foam breaks up and the pigment is deposited. Since the pigment is present only in the liquid between the bubble walls it is also placed upon the formed piece in this spacial distribution and applicable concentration. In this way a two-dimensional image of the three-dimensional foam is obtained on the formed piece, comparable to some extent to the surface pattern of marble. See the FIGURE. Through special selection of glaze, pigments and process conditions it is therefore possible to produce "marbleized" surfaces in the desired combinations of color and form.

EXAMPLES

The foam-producing cell consists of a funnel-shaped container made of special steel with an upper diameter of 10 cm, a height of 50 cm and with its lower end shaped into an air connection piece having a diameter of 1 cm. Around this container is placed an additional container of identical construction with an upper diameter of 120 cm and a height of 80 cm, with its lower end shaped into an outlet piece 2 cm in diameter and leading into a supply container.

The mixture capable of foaming (pulp) consists of:

| | | |
|---|---|---|
| 1. | 2.4 | parts in weight of fatty coconut acid dethanolamide |
| 2. | 4.5 | parts in weight of dodecylbenzolsulfonate-Na |
| 3. | 3.6 | parts in weight of bentonite (set clay < ca. 60 μm) |
| 4. | 750.0 | parts in weight of zircon silicate* |
| 5. | 750.0 | parts in weight of lead monosilicate* |
| 6. | 1486.5 | parts in weight of tap water, 18° dH |

*Reimbold und Strick Company, Cologne

The above-mentioned components, with the exception of the first two, are ground up and mixed for approximately 5 hours in a ball mill. The components 1 and 2 are mixed in at the end.

The ball mills generally consist of a sealable cylindrical porcelain container filled to one third with porcelain balls (diameter 2 cm).

The same quantity by volume is added in form of pulp.

The gas absorption by the prepared pulp takes place in funnel-shaped, open foaming cells by means of air which is fed in at a pressure of 0.01 to 0.05 bar via a nozzle having a bore of approximately 1 mm.

The amount of gas is adapted to the work rhythm, whereby the lower limit is selected so that no solids can settle.

The upper limit is selected so that a low quiet zone with a thick foam layer (20 to 50 cm) can be created and so that sufficient quantities can be produced for the production run. Excess foam is caught up in the outer container and is fed back into the supply container.

The ceramic piece is dipped into the foam layer (diameter of the individual bubbles is general up to 3 cm) and is handled in such manner that its entire surface is covered by the foam so that the pigment can be separated and deposited on it. "Surface" must be interpreted according to the product, i.e. in plates it is generally only the front, in cups and vases in general only the outside.

The formed piece thus covered is air dried at room temperature and is then fired in the conventional process at 1100° C.

Result:

A narrow network of partly sharply delineated and partly diffuse white rings of different sizes stand out on the deep-black background, giving the overall surface a "marbleized" aspect.

A pulp is prepared as in the above-described example (example 2) consisting of

| | | |
|---|---|---|
| 1. | 3.8 | parts by weight of dodecylbenzolsulfonate-Na |
| 2. | 1.5 | parts by weight of fatty coconut acid diethanolamide |
| 3. | 1.5 | parts by weight of lauryl-dimethyl-aminoxide |
| 4. | 9.0 | parts by weight of laurylether sulfate-Na (3 EO groups) |
| 5. | 3.6 | parts by weight of bentonite (.06 μm) |
| 6. | 300.0 | parts by weight of cobalt silicate* |
| 7. | 1200.0 | parts by weight of lead monosilicate* |
| 8. | 1480.6 | parts by weight of tap water, 18° dH |

*Reimbold und Strick Company, Cologne

The glaze-covered unfired formed piece is dipped into the foam layer as in the previous example (bubble diameter as a rule up to 6 cm) and is then fired.

Result:

On a white background, a wide-meshed network of blue rings stands out, whereby the overall effect can also be designated as marbleized (see enclosed FIGURE).

I claim:

1. Process for the production of colored decorations on ceramic bodies comprising
    forming an aqueous suspension of a pigment, said aqueous suspension containing at least one surface active agent,
    causing said aqueous suspension to foam,
    contacting said ceramic body with said foam and thereby depositing said pigment on said ceramic body, and
    heating said ceramic body to a temperature of about 600° to 1500° C.

2. The process of claim 1 wherein said surface active agent is selected from the group consisting of anionic, cationic, and non-ionic surfactants.

3. The process of claim 1 or 2 wherein said surface active agent is selected from the group consisting of alkylbenzene sulfonates, alkylsulfates, alkyl ether sulfates, aminoxides, alkylsulfosuccinates and alkanolamides.

4. The process of claim 1 or 2 wherein the ratio of water to pigment in said aqueous suspension is in the range of about 0.7:1 to 20:1 by weight.

5. The process of claim 1 or 2 wherein the ratio of water to pigment in said aqueous suspension is in the range of about 0.9:1 to 2:1 by weight.

6. The process of claim 1 or 2 wherein the ratio of water to pigment in said aqueous suspension is about 1:1 by weight.

7. The process of claim 1 or 2 wherein said surface active agent comprises about 0.001 to 10 g per 100 g of pigment.

* * * * *